United States Patent [19]

Buske

[11] 4,289,639
[45] Sep. 15, 1981

[54] METHOD AND COMPOSITION FOR REMOVING SULFIDE-CONTAINING SCALE FROM METAL SURFACES

[75] Inventor: Gary R. Buske, Midland, Mich.

[73] Assignee: The Dow Chemical Company, Midland, Mich.

[21] Appl. No.: 193,878

[22] Filed: Oct. 3, 1980

[51] Int. Cl.³ .......................... C02B 5/06; C11D 7/10; C11D 7/26; C23G 1/06
[52] U.S. Cl. .......................................... 252/87; 134/3; 134/41; 252/82; 252/136; 252/142; 252/148; 252/181
[58] Field of Search ................. 134/3, 41; 252/82, 87, 252/136, 142, 148, 390, 180, 181

[56] References Cited

U.S. PATENT DOCUMENTS 4,220,550  9/1980  Frenier ................................. 252/180

OTHER PUBLICATIONS

Gregory, T. C.: Uses and Applications of Chemicals and Related Materials–vol. II, Reinhold Publishing, N.Y., 1944, p. 157.
The Merck Index–Ninth Edition, published by Merck, Rahway, N.J., 1976, p. 4353.

*Primary Examiner*—Dennis L. Albrecht

[57] ABSTRACT

An aqueous cleaning composition is described herein which contains glyoxylic acid dissolved in an aqueous non-oxidizing acid. This cleaning solution is effective in removing acid-soluble, sulfide-containing scale from metal surfaces (e.g. refinery equipment) without the evolution of gaseous hydrogen sulfide.

9 Claims, No Drawings

METHOD AND COMPOSITION FOR REMOVING SULFIDE-CONTAINING SCALE FROM METAL SURFACES

BACKGROUND OF THE INVENTION

1. Field of the Invention

This invention pertains to an improved method of chemically cleaning acid-soluble, sulfide-containing scale from metal surfaces. The improved process utilizes a new cleaning solution which contains an aqueous acid and glyoxylic acid. The glyoxylic acid is present in amounts sufficient to prevent or substantially prevent the evolution of hydrogen sulfide gas.

2. Description of the Prior Art

Many sources of crude oil and natural gas contain high amounts of hydrogen sulfide. Refineries processing such crude oil or natural gas commonly end up with substantial amounts of sulfide-containing scale on the metal surfaces in contact with the crude oil or gas. This scale is detrimental to the efficient operation of heat exchangers, cooling towers, reaction vessels, transmission pipelines, furnaces, etc. Removal of this sulfide-containing scale has been a substantial problem because conventional acid-cleaning solutions react with the scale and produce gaseous hydrogen sulfide.

Hydrogen sulfide gas produced during the cleaning operation leads to several problems. First, hydrogen sulfide is an extremely toxic gas and previous techniques have required the entire system to be vented to an appropriate flare system (in which the gas is burned) or to a sodium hydroxide scrubbing system. Neither of these alternatives is very attractive because the sulfur dioxide and sulfur trioxide formed during the burning of hydrogen sulfide are substantial pollutants in and of themselves. The sodium sulfide produced during the scrubbing system is a solid that presents disposal problems. It can be land-filled or put into disposal ponds but only under conditions such that the sodium sulfide does not contact acid. Sodium sulfide reacts rapidly with acids to regenerate hydrogen sulfide. Second, aside from the toxic nature of hydrogen sulfide, the material causes operational problems as well because it is a gas. The volume of gas produced can be substantial. The gas takes up space within the unit being cleaned and can prevent the liquid cleaning solution from coming in contact with all of the metal surfaces. This can occur, for example, in cleaning a horizontal pipeline where the gas can form a "pad" over the top of the flowing liquid and prevent the liquid from filling the pipeline ad cleaning the entire surface. The gas produced can also cause the pumps used in the system to cavitate, lose prime, and/or cease to function efficiently. And, of course, if enough gas is generated in a confined vessel the vessel can rupture.

These problems have been encountered in the industry and are severe.

Hydrogen sulfide and acid cleaning solutions containing hydrogen sulfide can cause severe corrosion problems on ferrous metals. The corrosion can be due to attack by acid and/or ferric ion corrosion. These corrosion problems have been met in the past by including minor amounts of corrosion inhibitors in the system. Aldehyde and aldehyde condensation products (normally with an amine) have been used as corrosion inhibitors in various systems. For example, they have been used alone or in combination with other corrosion inhibitors in aqueous acidic cleaning solutions and pickling baths or as an additive to crude oil. Under these systems, however the aldehyde was included in very minor amounts. The following patents are representative of how these aldehydes have been previously used in this regard: U.S. Pat. Nos. 2,426,318; 2,606,873; 3,077,454; 3,514,410; and 3,669,613.

The reaction of hydrogen sulfide with an aldehyde is a known reaction which has been the subject of some academic interest. See, for example, the journal articles abstracted by Chemical Abstracts in C.A.54:17014h; C.A.63:14690a; C.A.65:9026d. The references indicate that the product formed by hydrogen sulfide with formaldehyde is trithiane or low polymers. This product was also referred to in U.S. Pat. No. 3,669,613 cited above. In these references, the product was produced by bubbling hydrogen sulfide through the aqueous acid/formaldehyde systems and the patent indicates that the reaction should not be attempted at temperatures greater than abut 45° C. The patent also indicates that the reaction usually reaches completion in from about 5.5 hours to about 9.5 hours at ambient temperatures.

None of the references taught or suggested the unique phenomenon observed by Frenier et al. and described in their U.S. Pat. No. 4,220,550, the disclosure of which is incorporated herein by reference. Frenier et al. discovered that acid-soluble, sulfide-containing scale could be effectively removed from metal surfaces without the release of gaseous hydrogen sulfide by use of an aqueous acid cleaning composition comprising an aqueous nonoxidizing acid having at least one aldehyde dissolved or dispersed therein, with the aldehyde being present in such compositions in an amount at least sufficient to prevent or substantially prevent the evolution of hydrogen sulfide gas. This required at least a stoichiometric amount of aldehyde in the cleaning solution (i.e. at least one mole of aldehyde per mole of hydrogen sulfide produced during the cleaning) and an excess of aldehyde was preferred. By excess was meant, amounts beyond stoichiometric required and up to one equivalent weight of aldehyde or more per equivalent weight of acid. Their best system was an aqueous sulfuric acid cleaning solution containing excess formaldehyde.

The discovery of Frenier et al. represented a technical breakthrough in the chemical cleaning industry. Their discovery has been commercialized and widely accepted.

In a related case, Frenier described an improvement over U.S. Pat. No. 4,220,550. Frenier, U.S. patent application Ser. No. 100,794 filed Dec. 6, 1979. The improvement there described comprised generating the aldehyde in situ during the cleaning process. By conducting the cleaning process in this manner, procedural problems associated with the handling of certain aldehydes (e.g. formaldehyde) was alieviated.

SUMMARY OF THE INVENTION

A novel chemical cleaning solution has now been discovered which comprises an aqueous nonoxidizing acid having dissolved therein, glyoxylic acid.

This novel chemical cleaning solution is a unique species within the generic disclosure of Frenier et al. (U.S. Pat. No. 4,220,550) in that the reaction of product(s) of the chemical cleaning solution and the sulfide-containing scale (e.g. iron sulfide) are soluble in the acidic cleaning medium and do not form solid precipitates. Under treatment conditions, the novel cleaning composition removes the acid-soluble sulfide-containing scale from metal surfaces at a rate substantially equal to or greater than the preferred cleaning composition described by Frenier et al. (i.e. solutions comprising aqueous sulfuric acid with excess formaldehyde). Because of these factors, the use of the new cleaning composition in the method described by Frenier et al. results in an improved cleaning process.

DETAILED DESCRIPTION OF THE INVENTION

The Frenier et al. patent (U.S. Pat. No. 4,220,550) describes generically the chemical cleaning compositions, the relative ratio of ingredients, and methods of use. This patent has been incorporated herein by reference and so it would be redundant to repeat the information here. The primary distinction between the present invention and the Frenier et al. invention resides in the use of the glyoxylic acid as the aldehyde in the cleaning solutions. Glyoxylic acid appears to be a unique species within the genus of aldehydes described by Frenier et al. Glyoxylic acid corresponds to the chemical formula

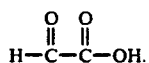

As stated in Frenier et al. the acidic cleaning solutions can utilize a variety of acids usually at concentrations ranging from about 5 to about 15 percent. Sulfuric acid and hydrochloric acids are preferred, and hydrochloric acid is most preferred in this instance. Frenier et al. also teach the wisdom of adding a compatible acid corrosion inhibitor to the acid cleaning solution (preferably an amine-based corrosion inhibitor) and emphasize the advantage of using the aldehyde in excess in the cleaning solution. The same teaching similarly applies here. Glyoxylic acid is added in an amount sufficient to prevent or substantially prevent the evolution of gaseous hydrogen sulfide when the cleaning solution is brought in contact with an acidsoluble, sulfide-containing scale.

The following example further illustrates the invention:

EXAMPLE 1

A solution of glyoxylic acid (7.5 grams (g) and water (102 milliliters (mL) was charged to a reaction vessel equipped with a gas scrubber containing 25 percent aqueous sodium hydroxide. The temperature of the glyoxylic acid/water solution was raised to 150° F. in a water bath and iron sulfide (FeS, 7.5 g) was then added. After the temperature of this mixture reached 150° F., 35 ml of concentrated (36 percent) hydrochloric acid was introduced and the bessel was quickly sealed. When the acid was first added, there was a brief initial smell of hydrogen sulfide but no detectable amount of hydrogen sulfide after that. Analysis of the sodium hydroxide scrubbing system using an ORION S= electrode gave a zero reading for sulfide. The cleaning solution dissolved all of the iron sulfide and the spent cleaning solution was a clear liquid without any noticeable amounts of solid precipitate. No evolution of hydrogen sulfide gas was observed during the three hour test.

What is claimed is:

1. An aqueous acid composition comprising an aqueous non-oxidizing acid having glyoxlic acid dissolved therein; said composition having, as one of its chemical properties, the capability of dissolving acid-soluble, sulfide-containing scale from a metal surface without the evolution of hydrogen sulfide gas.

2. The composition defined by claim 1 wherein said acid is hydrochloric acid or sulfuric acid.

3. The composition defined by claim 2 wherein said acid is hydrochloric acid.

4. The compostion defined by claim 1 additionally comprising a compatible acid corrosion inhibitor.

5. The compostion defined by claim 4 comprising a compatible amine-based corrosion inhibitor.

6. The composition defined by claim 2 wherein the concentration of said acid is from about 5 to about 15 percent and said glyoxlic acid is present in excess.

7. In the method of chemically cleaning acid-soluble, sulfide-containing scale from a metal surface comprising contacting said scale with an aqueous acid cleaning composition comprising an aqueous non-oxidizing acid having at least one aldehyde dissolved or dispersed therein, which aldehyde is present in an amount at least sufficient to prevent or substantially prevent the evolution of hydrogen sulfide gas the improvement comprising using glyoxlic acid as said aldehyde.

8. The method defined by claim 7 wherein said acid is hydrochloric acid or sulfuric acid.

9. The improvement defined by claim 8 wherein said acid is hydrochloric acid.

* * * * *